US011338509B2

(12) United States Patent
Bedoret et al.

(10) Patent No.: US 11,338,509 B2
(45) Date of Patent: May 24, 2022

(54) DEVICE AND METHOD FOR MANIPULATING PARTICLES

(71) Applicant: AEROSINT SA, Liège (BE)

(72) Inventors: Alexis Bedoret, Namur (BE); Matthias Hick, Limbourg (BE); Kevin Eckes, Etterbeek (BE)

(73) Assignee: AEROSINT SA, Liège (BE)

( * ) Notice: Subject to any disclaimer, the term of this patent is extended or adjusted under 35 U.S.C. 154(b) by 358 days.

(21) Appl. No.: 16/336,326

(22) PCT Filed: Aug. 21, 2017

(86) PCT No.: PCT/EP2017/071039
§ 371 (c)(1),
(2) Date: Mar. 25, 2019

(87) PCT Pub. No.: WO2018/059833
PCT Pub. Date: Apr. 5, 2018

(65) Prior Publication Data
US 2019/0240902 A1 Aug. 8, 2019

(30) Foreign Application Priority Data
Sep. 29, 2016 (BE) .................................. 2016/5725

(51) Int. Cl.
*B29C 64/205* (2017.01)
*B29C 64/141* (2017.01)
(Continued)

(52) U.S. Cl.
CPC .......... *B29C 64/205* (2017.08); *B29C 64/141* (2017.08); *B29C 64/159* (2017.08); *B33Y 10/00* (2014.12); *B33Y 30/00* (2014.12)

(58) Field of Classification Search
CPC ........ B22F 10/20; B22F 12/00; B29C 64/141; B29C 64/159; B29C 64/10
See application file for complete search history.

(56) References Cited

U.S. PATENT DOCUMENTS 4,938,816 A 7/1990 Beaman et al.
5,257,657 A * 11/1993 Gore ...................... B22D 23/00
164/46

(Continued)

FOREIGN PATENT DOCUMENTS

CN 103978206 A 6/2011
DE 90 18 138 U1 2/1996
(Continued)

OTHER PUBLICATIONS

International Preliminary Report on Patentability dated Apr. 2, 2019, issued in corresponding International Application No. PCT/EP2017/071039, filed Aug. 21, 2017, 1 page.
(Continued)

*Primary Examiner* — Joseph S Del Sole
*Assistant Examiner* — Mohamed K Ahmed Ali
(74) *Attorney, Agent, or Firm* — Christensen O'Connor Johnson Kindness PLLC

(57) ABSTRACT

A device and method for manipulating particles is provided. The device generally includes a screen acting as a support for a structure formed by particles, which can be selectively deposited on a first substrate. The device can be included in a 3D printing system.

17 Claims, 12 Drawing Sheets

(51) Int. Cl.
  *B29C 64/159* (2017.01)
  *B33Y 10/00* (2015.01)
  *B33Y 30/00* (2015.01)

(56) References Cited

U.S. PATENT DOCUMENTS

| | | |
|---|---|---|
| 5,637,176 A | 6/1997 | Gilleo et al. |
| 5,767,877 A | 6/1998 | Mei et al. |
| 7,946,840 B2 | 5/2011 | Perret et al. |
| 8,366,432 B2 | 2/2013 | Perret et al. |
| 2004/0084814 A1 | 5/2004 | Boyd et al. |
| 2007/0126157 A1 | 6/2007 | Bredt |
| 2014/0167326 A1 | 6/2014 | Jones et al. |
| 2015/0266241 A1 | 9/2015 | Batchelder |
| 2017/0197365 A1 | 7/2017 | Sugiyama et al. |

FOREIGN PATENT DOCUMENTS

| | | |
|---|---|---|
| JP | H0818375 B2 | 2/1996 |
| JP | 2014-517350 A | 7/2014 |
| RU | 2422277 C2 | 6/2011 |
| RU | 2424904 C2 | 7/2011 |
| WO | 95/26871 A1 | 10/1995 |
| WO | 2008/028443 A2 | 3/2008 |
| WO | 2016/176432 A1 | 11/2016 |

OTHER PUBLICATIONS

Search Report completed Aug. 27, 2020, issued in corresponding RU Application No. 2019109654, filed Aug. 21, 2017, 2 pages.
Office Action issued in corresponding RU Application No. 2019109654, filed Aug. 21, 2017, 3 pages.
International Search Report dated Oct. 18, 2017, issued in corresponding International Application No. PCT/EP2017/071039, filed Aug. 21, 2017, 6 pages.
French Written Opinion, issued in corresponding International Application No. PCT/EP2017/071039, filed Aug. 21, 2017, 6 pages.
Office Action issued in corresponding JP Application No. 2019-516940, dated Jul. 27, 2021, 3 pages.

* cited by examiner

DEVICE AND METHOD FOR MANIPULATING PARTICLES

TECHNICAL FIELD

According to a first aspect, the present invention relates to a device for manipulating particles. According to a second aspect, the present invention relates to a method for manipulating particles.

PRIOR ART

The document U.S. Pat. No. 5,767,877 discloses a device for manipulating particles. This device comprises a two-dimensional printing matrix intended to receive particles of toner. Each of the pixels of the matrix comprises a valve and a cavity. The cavities are separated from one another by a portion of surface. The matrix thus forms a support that has a first outer surface that has openings wherein the particles of toner are placed. The particles of toner are suctioned in the cavities for which the valves are open. Each cavity is provided to receive one single particle of toner. When a particle is in a cavity, it plugs the suction duct thereof, preventing the suction of other particles.

This known device has several problems. Firstly, the particles must have a substantially spherical shape, so as to be able to penetrate into the cavities and plug the suction ducts. Then, the particles must substantially be of all the same size, so as to be able to penetrate into the cavities and plug the suction ducts. Furthermore, the separations between the cavities are such that this device does not make it possible to constitute a continuous structure of particles.

SUMMARY OF THE INVENTION

According to a first aspect, one of the purposes of the invention is to provide a device that makes it possible to create a continuous structure of particles of various sizes and shapes. To this end, the invention proposes a device for manipulating particles and comprising a flow generator arranged to generate a transport fluid flow, characterised in that the device further comprises a screen having a first outer surface from which the structure formed by particles can be formed, the screen comprising through-holes opening via openings onto said first outer surface, and the transport fluid flow being provided to transport the particles to or from the first outer surface of the screen.

A screen makes it possible for the structure formed by particles to be formed by particles piling up against the first outer surface and not in the screen. As this first outer surface is only "outer", it does not comprise the "inner" walls of the holes. Thus, particles of various sizes, shapes and materials can be included in the same structure formed by particles against the first outer surface of the screen. Indeed, there is no condition on the material, the size or the shape of the particles. Furthermore, the particles can be against each other, without separation between them, which makes it possible for them to form a continuous structure of particles. They can also pile up in a direction perpendicular to the first outer surface of the screen, thus forming a structure of a certain thickness.

In the scope of the present document, a screen is a porous medium permeable to the fluid (for example, the screen can comprise through-holes wherein the fluid can pass) and of which at least one first outer surface cannot be penetrated by the particles of the structure (i.e. the particles remain blocked against said first outer surface and do not penetrate into the screen).

The screen, and in particular the first outer surface thereof, is used as a support for the particle structure.

In an embodiment of the invention, the screen comprises through-holes which open onto the first outer surface via openings. The holes and the openings thereof are arranged to allow the transport fluid flow to pass at least partially through the screen, and the openings, through the shape thereof and the arrangement thereof on the first outer surface, are arranged to block the particles. Preferably, the holes and the openings thereof are arranged to allow all of the transport fluid flow to pass through the screen. Preferably, the holes pass through the screen through the thickness thereof, i.e. along a direction substantially perpendicular locally to the first outer surface. Preferably, the screen has a second outer surface substantially parallel to the first outer surface and the thickness of the screen is delimited by the first and second outer surfaces.

In other words, the openings in the first outer surface of the screen are arranged such that the first outer surface blocks the particles outside of the screen, while still allowing the transport fluid flow to pass via the holes through the screen. The particles are thus blocked outside of the screen and not in the holes of the screen. Thus, the first outer surface of the screen is provided such that the particle structure can be formed against it.

In the scope of the present document, the first outer surface of the screen is understood as not comprising the inner walls of the holes in the screen, since the first outer surface is only an outer surface. Thus, the particles are blocked against the portions without holes of the first outer surface of the screen.

The first outer surface of the screen can be substantially flat. The first outer surface of the screen can be such that a straight segment that connects two points of the first outer surface of the screen is fully comprised in the first outer surface of the screen. The first outer surface of the screen can be convex. The first outer surface of the screen can be mainly cylindrical.

With the device according to the invention, it is possible to manipulate particles individually or sets of particles.

It is possible to control the thickness of the particle structure, for example by scraping or by controlling the transport flow.

The device according to the invention is capable of manipulating particles and creating a particle structure.

In an embodiment of the invention, the device makes it possible to selectively deposit a portion of the particle structure, for example on a first substrate.

In the scope of the present document, a "pixel" is a portion of a surface, for example of the first outer surface of the screen, which can be covered with particles independently from the remainder of said surface. A pixel is therefore an addressable portion of a surface, for example of the first outer surface of the screen. In the scope of the present document, a "voxel" is a portion of the particle structure that corresponds to one pixel.

The transport fluid flow can be seen, at a given instant, as a set of fluid flow elements, with each flow element corresponding preferably to a different pixel. Preferably, each transport fluid flow element has a mainly square or round section. This makes it possible for the pixels to have an approximately uniform extent in all of the directions.

The particles can for example comprise a polymer, a metal, a salt, a ceramic or an organic material. They can have a size distribution with an average size of 1 µm, 10 µm, 100 µm, 1 mm or 10 mm. They can have a mainly spherical shape or any other shape. The particles can be suitable for forming an object via 3D printing via a method of selective agglomeration. The particles can, on the contrary, be inert and difficult to agglomerate to be used as a support during a 3D printing.

The screen can be made of different materials (metal, organic, polymer, ceramic, etc.), and produced by different methods (weaving, perforations, punching, chemical photo-engraving, electroforming of metal (nickel, copper, gold, etc.), sintered powder or fibres, filtration foam, etc.).

In the scope of the present document, a "layer of particles" can be the particle structure formed against the first outer surface of the screen or can be created on a first substrate from the particle structure formed on the first outer surface of the screen. A layer of particles can also be called a stratum, in particular after a deposition from the first outer surface of the screen. The layer of particles is a mainly continuous layer of particles forming an "image" of particles.

The first substrate can comprise particles that are agglomerated beforehand and/or a solid object to be integrated with particles.

The creation of the structure formed by particles can be called "composition".

The device preferably comprises a supply of particles that supplies particles of a size that is sufficient to be blocked by the first outer surface of the screen.

The first outer surface of the screen is preferably the surface of the screen located opposite the flow generator.

The device can further comprise a purge system for deeply washing the screen. It can for example be a suction strip provided to be put into contact or arranged in the proximity of the screen. The purge system can for example include an aspirator, an ejection blade in an interior space of the screen if the first outer surface of the screen is convex or a suction blade outside the screen if the first outer surface of the screen is convex.

In an embodiment of the invention, the openings of the holes are arranged to block any spherical body of more than 1 mm in diameter, preferably 10 µm in diameter, more preferably 1 µm in diameter, and even more preferably 0.1 µm in diameter, outside of the screen.

In an embodiment of the invention, the openings of the holes are such that the diameter of the smallest circle circumscribed in any of said openings is smaller than the diameter of the smallest sphere inscribed in any of the particles.

This condition is sufficient such that no particle penetrates into any opening.

Preferably, the screen is a grid.

This makes it possible for the screen to be particularly simple and inexpensive. A grid comprises for example a plurality of elements that intersect by forming a mesh. A grid can be regular or irregular.

In an embodiment of the invention, the device is arranged such that the transport fluid flow passes only through predetermined portions of the first outer surface of the screen.

This makes it possible in particular for several types of particles to be blocked against the first outer surface, in different portions of the first outer surface. Thus, the structure formed by particles can comprise at least one first portion only comprising particles of a first type and a second portion only comprising particles of a second type. The types of particles are differentiated for example by at least one of: the size distribution thereof, the material thereof, the shape thereof, the colour thereof, the Young's modulus thereof, the density thereof, the thermal conductivity thereof, the electrical conductivity thereof, the magnetic permeability thereof, the resistance to corrosion thereof, the hardness thereof, the melting temperature thereof, the solubility thereof, the combustibility thereof, the hydrophobicity thereof, the chemical composition thereof.

This also makes it possible for the particles to form a precise pattern on the first outer surface, with this pattern corresponding to the portions of the first outer surface passed through by the transport fluid flow, potentially during several steps.

In an embodiment of the invention, the device comprises a means of movement of the flow generator.

This makes it possible to modify the portions of the first outer surface passed through by the transport fluid flow. The portions of the first surface can also be called "subsurfaces".

In an embodiment of the invention, the device comprises a mask between the flow generator and the screen.

The mask makes it possible to select which portions of the first outer surface are subjected to the transport fluid flow. Indeed, the portions of the masked first outer surface are not passed through by the transport fluid flow. The mask can be static, i.e. the structure thereof cannot be modified. The mask can be dynamic, i.e. the structure thereof can be modified, for example via addressing. The mask, whether it is static or dynamic, can be mobile. The mask can correspond to the entire first outer surface or only to a portion of it. If the mask is flexible, the screen preferably makes it possible to provide it with a certain rigidity. The mask is preferably able to be detached from the screen. Thus, it is possible to avoid exposing the mask to an atmosphere that can damage it (temperature, humidity, dust, etc.). For example, detaching the mask before a sintering can be of interest in order to have it avoid the temperature linked to sintering.

The size of a pixel depends on the characteristics of the transport fluid flow and the distances between the mask, the flow generator and the screen.

In an embodiment of the invention, the device comprises a means of movement of the mask.

This can be particularly useful when the mask only corresponds to one portion of the first outer surface. The means for movement of the mask can be coupled with the means of movement of the flow generator such that the transport fluid flow and the mask correspond systematically to the same portions of the first outer surface. The mask is preferably moved parallel to the first outer surface. The movement of the mask can also make it possible to obtain a better resolution and to reduce the production costs. A movement of the flow generator can also make it possible to obtain a better resolution and to reduce the production costs.

In an embodiment of the invention, the mask is arranged such that the configuration of the open and closed portions thereof can be modified.

In an embodiment of the invention, the device comprises a valve matrix. For example, the mask comprises a valve matrix. Preferably, the valves can be addressed. More preferably, each valve can be addressed independently of the other valves. Preferably, each valve is arranged to control a transport fluid flow element.

In an embodiment of the invention, the size of each valve corresponds to the size of one pixel. In another embodiment of the invention, the size of a valve is less than or greater than the size of one pixel. An open valve makes it possible to allow the transport fluid flow to pass in order to suction the particles towards the first outer surface or to blow the particles from the first outer surface. Using a screen separate from the valve matrix makes it possible to protect the valve matrix of the working environment (heat, radiation, impact, humidity, electrostatic effects). Furthermore, the screen can be changed during maintenance without it being necessary to change the matrix and the matrix can be changed without it being necessary to change the screen. The valve matrix is preferably parallel to the first outer surface.

The valves can for example be solenoid valves, microspeakers, MEMS (piezo, electrostatic, solenoids, etc.).

In an embodiment of the invention, the device comprises a means of movement of the flow generator, a mask between the flow generator and the screen and a means of movement of the mask, the means of movement of the mask being coupled with the means of movement of the flow generator such that the transport fluid flow and the mask correspond to the same portions of the first outer surface.

In an embodiment of the invention, the flow generator comprises a suction device provided to create the transport fluid flow from the first outer surface to the flow generator.

This makes it possible to suction the particles towards the first outer surface, i.e. to attract them thereto.

In an embodiment of the invention, the device comprises a reservoir of particles.

The reservoir makes it possible for the supply of the transport flow with particles. The reservoir is arranged such that the flow suctioning these particles can suction them from the reservoir. The reservoir can comprise a flat surface, located facing the first outer surface, and whereon the particles are distributed.

In an embodiment of the invention, the flow generator comprises an ejection device provided to create the transport fluid flow from the flow generator to the first outer surface.

This makes it possible to eject the particles from the first outer surface, i.e. to eject them therefrom. Preferably, the transport fluid flow passes through the screen from the second outer surface to the first outer surface in order to eject the particles present on the first outer surface. The ejection device can for example comprise a blower or a sound wave emitter. The ejection device can for example be arranged to eject the transport fluid by pulses from 0.1 ms to 1 s. The transport fluid flow is selected to break the retaining or adhesion force between the first outer surface and the particles.

In an embodiment of the invention, the device further comprises a particle collector arranged to collect the particles coming from the first outer surface.

In an embodiment of the invention, the device comprises a means of spreading particles against the first outer surface of the screen.

This spreading means makes it possible to supply the first outer surface with particles. The spreading can be carried out for a particle structure located on the screen or under the screen. The spreading means can comprise a scraper that makes it possible for the particle structure to be approximately uniform and controlled by the scraping.

In an embodiment of the invention, the first outer surface of the screen extends mainly in a first direction and a second direction perpendicular to the first direction and in that the flow generator is arranged such that the transport fluid flow that it generates is substantially in a third direction perpendicular to the first and second directions.

This makes it possible to have a first outer surface that is mainly flat. The mask, if there is one, is then preferably also mainly flat.

In an embodiment of the invention, the first outer surface of the screen is substantially a convex surface, for example a cylinder, delimiting at least partially an interior space.

Preferably, the convex surface is closed on itself in order to form a loop. This can for example be a cone, a cylinder, a conveying surface, a mat or a belt. Preferably, the device is arranged such that the convex surface can rotate, such that a portion of the convex surface can be moved cyclically in order to continuously supply particles towards a detachment zone.

This makes it possible to create the particle structure and a deposition of the latter on a first substrate continuously.

In an embodiment of the invention, the flow generator is at least partially located in the interior space of the convex surface.

Preferably, the device is arranged such that the cylindrical screen can rotate about the axis thereof. The cylinder is preferably hollow.

In an embodiment of the invention, the flow generator comprises a first portion located in the interior space and a second portion located outside the interior space, the first portion and the second portion being connected fluidically by a fluidic communication means.

The fluidic communication means preferably comprises a pipe or a plurality of pipes. It is preferred that the fluidic communication means pass through an end of the convex surface, for example of the cylinder, to make the junction between the first and the second portions of the flow generator.

In an embodiment, the first portion of the flow generator is at a fixed position with respect to an axis of rotation of the convex surface. In another embodiment, the device is configured such that the first portion of the flow generator can be moved with respect to this axis of rotation. For example, it is possible that the first portion of the flow generator be arranged to create a translation movement parallel and/or perpendicular to the axis of rotation of the convex first outer surface of the screen, for example of the cylindrical screen.

For example, a translation movement parallel to the axis makes it possible for each of the openings of the first portion of the flow generator to deposit particles over several parallel lines.

The first portion of the flow generator can also be called a "printing head". The first portion of the flow generator is preferably at least partially located between the axis of rotation and the portion of the screen from which the particles are ejected.

In an embodiment of the invention, the first portion of the flow generator is a rigid support that makes it possible to group the fluidic communication means and to direct the transport fluid flow towards a specific portion of the screen. Preferably, each fluidic communication means corresponds to a transport fluid flow element. The first portion of the flow generator makes it possible to align the fluidic communication means such that the fluid flow elements have a direction that is mainly parallel and preferably, mainly perpendicular to the first outer surface of the screen.

In another embodiment of the invention, the number of fluid flow elements is greater than the number of fluidic communication means. For example, there may be only one single pipe between the first and the second portions of the flow generator and the first portion of the flow generator can comprise a plurality of valves that can be addressed. Each fluid flow element then corresponds to a valve. The device then preferably comprises an electrical communication means that makes it possible to control the valves. This electrical communication means can be, for example, a cable passing through an end of the convex first outer surface, for example through an end of the cylinder.

Preferably, the transport fluid flow and in particular the transport fluid flow elements are perpendicular to the first outer surface of the screen in the detachment zone where the particles are driven by the transport fluid flow.

In an embodiment of the invention, the first portion or the second portion of the flow generator comprises a plurality of valves.

For example, the first or the second portion of the flow generator can include a valve matrix. If it is the second portion that comprises valves, each valve can be connected to a fluidic communication means. Each fluid flow element corresponds to a valve.

In an embodiment of the invention, each valve is arranged to control a transport fluid flow element arranged to pass through a portion of the first outer surface of the screen. This makes it possible for a precise control of the particles to be ejected or suctioned.

In an embodiment of the invention, the first portion of the flow generator comprises a plurality of openings directed towards the first outer surface of the screen, the device being arranged such that a transport fluid flow element passes in one of said openings. Preferably, each opening is in fluidic communication with a valve.

In an embodiment of the invention, the screen continuously provides material facing the openings, which deposits particles in a controlled manner on the first substrate. The controlling of the thickness of the particles deposited can in particular be done by the position of a second scraper and/or by controlling the rotation speed of the screen.

Each opening is capable of depositing a line of particles. If the transport fluid flow is made of pulses, each opening is capable of depositing a line of pixels.

In an embodiment of the invention, the openings of the first portion of the flow generator are arranged to be staggered.

In an embodiment of the invention, the device further comprises a suction means arranged to retain the particles on the first outer surface.

This suction means can be, for example, a device that creates a depression in the interior space delimited by the first convex outer surface. This device for creating a depression can for example comprise a fan.

In an embodiment of the invention, the device further comprises a means of movement of the screen, for example in rotation and/or translation.

Preferably, this means of movement makes it possible to translate the screen having a first convex outer surface in a direction perpendicular to the axis of rotation thereof, for example to the axis of the cylindrical screen. For example, if this axis is horizontal, this movement means can be arranged to move the screen horizontally and/or vertically. Furthermore, it is also possible that this movement means makes it possible to translate the screen in a direction parallel to the axis of rotation thereof.

In an embodiment of the invention, the fluid is a gas.

In an embodiment of the invention, the fluid is a liquid.

In an embodiment of the invention, the screen comprises through-holes perpendicular to the first outer surface of the screen, preferably the holes are straight prisms or straight cylinders.

The fact that the holes have inner walls perpendicular to the first outer surface makes it possible for the particles to not be blocked in the holes.

Furthermore, the invention proposes a 3D printing system comprising:
  at least one device according to one of the embodiments of the invention, and
  an agglomeration means.

The 3D printing system can for example comprise two, three, four, etc. devices each having a screen having a first convex outer surface.

Preferably, the device thus makes it possible to deposit at least one portion of a stratum of particles and the agglomeration means makes it possible to agglomerate at least one portion of the stratum of particles.

In the scope of the present document, a stratum of particles is a layer of particles. For example, a stratum can be at least partially deposited using one or more devices for manipulating particles according to an embodiment of the invention.

The 3D printing system according to the invention has many advantages, of which:
  it is possible to form gradients of materials,
  it is possible to form strata resistant to corrosion, and
  it is possible to create mechanical non-chemical connections, between two different materials,
  the voxels forming the printed parts can have different shapes and be comprised of different materials, with these materials being able to respond to different functions (colour, Young's modulus, density, thermal conductivity, electrical conductivity, magnetic permeability, resistance to corrosion or to fatigue, hardness, melting temperature, solubility, combustibility, wettability, chemical composition, or any other physical characteristic).

In an embodiment of the invention, the 3D printing system further comprises a means of uniformisation of the height of the stratum of powder deposited on the 3D printing structure. This can for example be a blade that scrapes the particles forming protuberances, a compaction roller that renders the stratum more compact, a compaction plate that renders the stratum more compact and/or a generator of vibrations that flattens the stratum. For example, the compaction roller itself can be vibrating in order to fluidise the powder and improve the scraping (better surface condition and faster scraping). The means of uniform isation can be covered with a non-stick coating in order to prevent the particles from adhering thereto.

Preferably, the 3D printing structure comprises a device for creating an internal atmosphere, for example a nitrogen atmosphere. This makes it possible to limit the risks of explosion and of oxidation and/or of alteration of the powder. Preferably, the powder reservoir, the screen and the 3D printing structure are in this inert atmosphere.

Preferably, the 3D printing system comprises a chamber that surrounds the reservoir of particles, the screen and the 3D printing structure. Preferably, for semi-crystalline polymer powder, the inside of this chamber is heated to a temperature that is greater than the crystallisation temperature of the powder and less than the melting temperature of the powder. This makes it possible to limit any deformation of the part under construction as an excessively high temperature would damage the quality of the scraping of the powder. For example, this temperature can be close to 178° C. for a PA12 powder.

The 3D printing system according to the invention is compatible with any material.

In an embodiment of the invention, the powder used to form the part under construction comprises at least one of the following materials: a polymer (for example: TPE, PP, PA12, PA6, TPU, conductive TPU, PEEK, PPS), a metal (titanium, steel, aluminium, copper, palladium, gold, chromium, magnesium, cobalt, silver, alloy, etc.), a ceramic (silica, alumina, etc.), a salt or an organic powder.

The 3D printing system according to the invention makes it possible for a selective depositing of particles of a first type and of a second type different from the first type. The particles of different types are preferably ejected so as to form a continuous stratum and without a particle hole on the 3D printing structure.

For example, the particles of the first type can be provided to be sintered in order to form the object under construction and the particles of the second type can be inert during the sintering. It is also possible that two types of particles are used for the construction of the object, which makes it possible to create a multi-material object. This makes it possible to create an object that has certain portions made of a conductive material and others of a non-conductive material, an object that has rigid portions and flexible portions, an object that has several colours, several surface states, an object that has soluble portions and insoluble portions, an object that has magnetic portions and non-magnetic portions.

Preferably, the 3D printing system comprises a means of movement of the 3D printing structure and/or of the first substrate. This movement means can make it possible for at least one from among: a vertical translation, a horizontal translation in a first direction, for example left-right, a horizontal translation in a second direction, for example front-rear.

The agglomeration means makes it possible to adhere at least one portion of the particles deposited to the 3D printing structure, such that these particles are integrated into this 3D printing structure. In the scope of the present document, an agglomeration of particles is a fastening together of said particles. An agglomeration is preferably selective, in that inert particles are not agglomerated. An agglomeration can comprise at least one method from among the following: a heat treatment, a sintering, a melting, an application of glue, an application of binder. For example, the agglomeration means can comprise at least one from among: a furnace, a laser, an electron beam, a laser provided with a scanning system in order to be able to heat the entire stratum, a halogen lamp, a local or uniform chemical reaction. The agglomeration can be carried out uniformly line-by-line, by sweeping in one single direction with a beam heating the material along a line. The agglomeration means can move at the same time as the screens or be decoupled from the latter.

Preferably, the system is arranged such that the means of agglomeration agglomerate the particles outside of the detachment zone where the particles are deposited on the 3D printing structure.

In an embodiment of the invention, the 3D printing system further comprises a means of deposition of the structure of particles present against the first outer surface of the screen. Furthermore, the deposition means can be the ejection device.

The deposition means, which can form a part of the device for manipulating particles, can make it possible to form a stratum of particles.

The deposition means makes it possible to detach the particle structure from the first outer surface of the screen. The deposition means preferably makes it possible to deposit the particle structure against a 3D printing structure, preferably on a 3D printing structure. It can also optionally make it possible to move the screen, for example vertically, such that the particle structure of the first outer surface is against the 3D printing structure. The deposition means of the particle structure can for example comprise the flow generator, in particular if the latter is an ejection device.

In an embodiment of the invention, the deposition means comprises a mobile transfer substrate that has a transfer surface that can be positioned facing the first outer surface of the screen such that at least one portion of the particles present against the first outer surface of the screen can be transferred on the transfer surface of the transfer substrate. Preferably, the layer of particles against the transfer surface is created several times, for example by several successive ejections of particles against the first outer surface of the screen.

The layer of particles can thus be formed on the transfer surface of the transfer substrate. The transfer surface of the transfer substrate can be mainly flat and horizontal. It can be oriented downwards or upwards. It is the layer of particles against the transfer surface that is deposited against the 3D printing structure. The layer of particles against the transfer surface is preferably continuous, for example because the particle structure against the first outer surface of the screen was continuous or because several different particle structures were used to form the layer of particles against the transfer surface. The transfer substrate can comprise a second screen, in which case the screen against which is located the structure formed by particles can be called a first screen.

In an embodiment of the invention, the 3D printing system comprises a plurality of screens. Preferably, each screen manipulates a different powder. For example, the screens can comprise a first convex outer surface arranged to rotate according to an axis of rotation. The screens can be arranged such that the axes of rotation thereof are parallel. The screens can also be arranged so as to deposit the powders in two different directions.

This makes it possible for each screen to deposit a different powder on the 3D printing structure. The system can comprise one, two, three, four, etc. screens. Preferably, each screen is used to deposit a different powder on the 3D printing structure. They can have different particle sizes, materials and shapes or be scraped at different thicknesses for example.

In an embodiment of the invention, the 3D printing system further comprises a means for bringing together and for separating of the screen and of a 3D printing structure.

This makes it possible to separate little by little the 3D printing structure after the formation of each stratum of particles. For example, the 3D printing structure can be separated each time preferably by a distance between 20 and 1000 μm, more preferably between 50 and 200 μm. This can be the screen that moves away from the 3D printing structure and/or the 3D printing structure that moves away from the screen.

According to a second aspect, the invention proposes a method for manipulating particles comprising:

(a) the supplying of a device for manipulating particles according to the invention, (b) the supplying of particles to said device, and (c) the transporting of particles by the transport fluid flow to or from the first outer surface of the screen.

This makes it possible to create a structure formed by particles against the first outer surface of the screen or by ejection from the latter.

In an embodiment of the invention wherein the first outer surface is convex, the method includes that the rotation speed of the screen and the translation speed of the 3D printing structure are selected such that the difference in tangential speeds is zero in the detachment zone where the powder is ejected from the screen to the 3D printing structure. Ensuring a rotation that is faster or less faster than the forward speed in translation of the 3D printing structure makes it possible to control a transfer flow rate of particles that is faster or less faster.

The advantages mentioned for the system apply mutatis mutandis to the method.

In an embodiment of the invention, step (c) comprises the transporting of particles by the transport fluid flow to or from predetermined portions of the first outer surface of the screen. This makes it possible to select which particles are transported. The transport of particles can result from a rupture in the forces of adhesion between the particles and the screen. In the scope of the present document, a sound wave is considered as a transport fluid flow.

This makes it possible for certain pixels of the first outer surface to be covered with particles or, on the contrary, be released from particles. This can be done for example by applying a mask in the portions of the first outer surface where the transport of particles is not sought. This can also be done by applying the transport fluid flow only in the portions of the first outer surface where a transport of particles is sought.

In an embodiment of the invention, step (b) comprises the supply of particles of a first type and of a second type and step (c) comprises:

a step (c1) of transport, by the transport fluid flow, of the particles of the first type to or from first predetermined portions of the first outer surface of the screen and a step (c2) of transport, by the transport fluid flow, of particles of the second type to or from second predetermined portions of the first outer surface of the screen.

In an embodiment of the invention, step (b) comprises the supply of particles of a first type and of a second type and step (c) comprises:

a step (c1) of transport, by the transport fluid flow, of particles of the first type to or from first predetermined portions of the first outer surface of a first screen and a step (c2) of transport, by the transport fluid flow, of particles of the second type to or from second predetermined portions of the first outer surface of a second screen.

A type of particles can be specified by a characteristic of the particles or a set of characteristics of particles. For example, particles that have different materials, different shapes, different size distributions can be of different types. Such a structure is a composition of different types of particles.

In an embodiment of the invention, the particles of the first type are likely to be agglomerated by a determined method and the particles of the second type are not likely to be agglomerated by said method. For example, the particles of the first type are likely to be sintered at a first sintering temperature and the particles of the second type are not likely to be sintered at the first sintering temperature.

The particles of the first type can be used for 3D printing and the particles of the second type are used as support for 3D printing. The particles of the second type can be for example silica.

Furthermore, the invention proposes a 3D printing method comprising:

the steps of the method for manipulating particles according to the invention, and the agglomeration of at least one portion of the particles.

The agglomeration can comprise an agglomeration of at least one portion of the particles of the stratum between them and/or an agglomeration of at least one portion of the particles of the stratum with a 3D printing structure. The agglomeration can take place point by point, line by line, plane by plane or also the entire volume of the 3D printing structure at one time. In the latter case, the deposition of the particle structure is carried out several times and the agglomeration is carried out one single time.

Furthermore, the invention proposes a 3D printing method comprising:

the steps of the method for manipulating particles according to the invention, the deposition of the structure of particles present against the first outer surface of the screen, so as to form a stratum of particles, and the agglomeration of at least one portion of the stratum of particles.

The deposition is preferably a deposition on a 3D printing structure which is the already-constructed portion of a part printed via 3D printing.

BRIEF DESCRIPTION OF THE FIGURES

Other characteristics and advantages of the invention will appear upon reading the following detailed description for the understanding of which, reference will be made to the appended figures among which.

EMBODIMENTS OF THE INVENTION

The present invention is described with particular embodiments and references to figures, but the invention is not limited by the latter. The drawings or figures described are only schematic and are not limiting.

In the context of the present document, the terms "first" and "second" are only used to differentiate the various elements and do not imply an order between these elements.

In the figures, identical or similar elements can bear the same references.

Figure 1A:
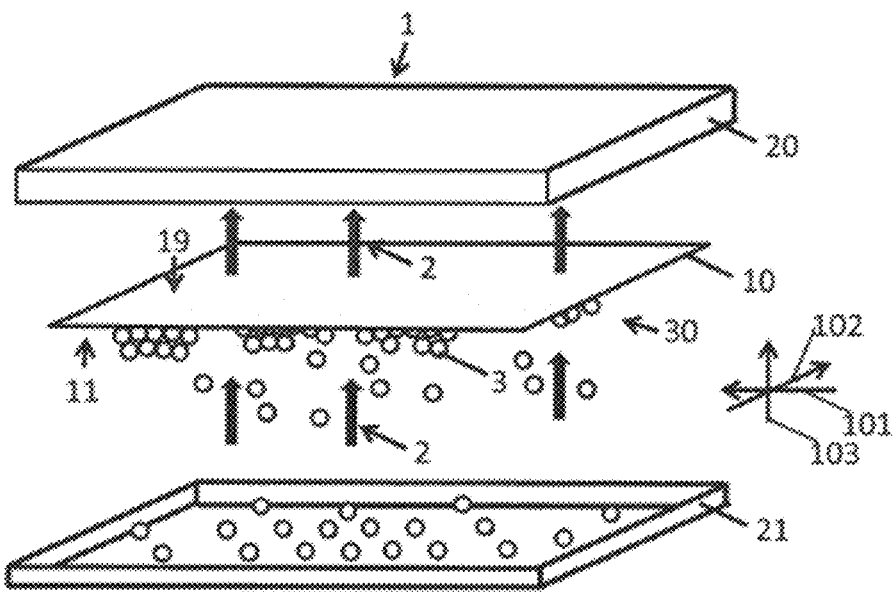
FIG. 1a shows a device for manipulating particles according to the present invention.
Figure 1B:
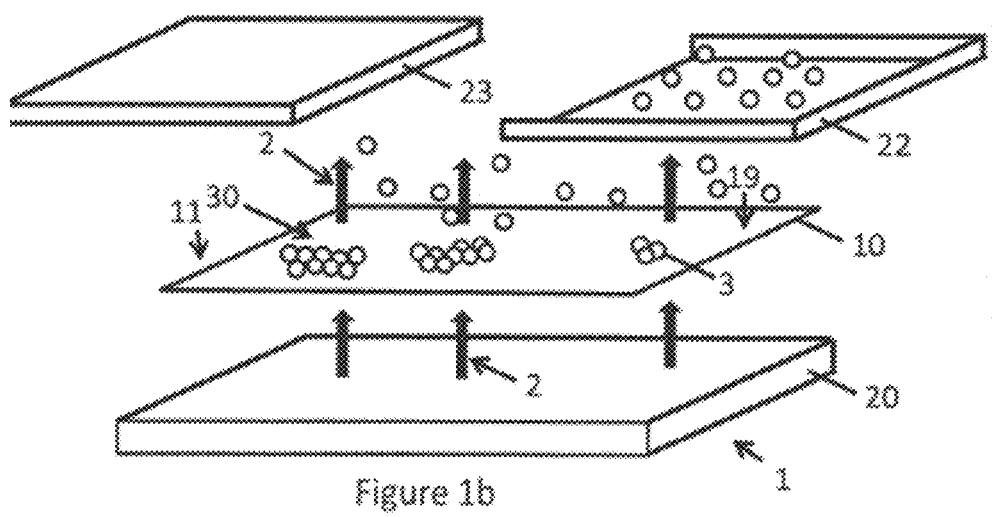
FIG. 1b shows a device for manipulating particles according to the present invention.

FIG. 1a shows a device 1 for creating a particle 3 structure 30 according to the present invention. FIG. 1b shows a device 1 for creating a particle 3 structure 30 according to the present invention. The device 1 comprises a flow generator 20 capable of generating a transport fluid flow. The flow generator 20 can be on or off so as to generate or cut off the transport fluid flow. It is possible, while still remaining within the scope of the invention, for the transport fluid flow 2 to be comprised of pulses.

The device 1 comprises a screen 10 that is a support for the particle 3 structure 30. The screen 10 has a first outer surface 11 and a second outer surface 19. The screen 10 has through-holes 12 (visible in FIG. 2a) that open onto the first outer surface 11 by the openings. The holes 12 also open onto the second outer surface 19. The openings block the particles 3 outside of the screen 10 and allow the transport fluid flow 2 to pass through the holes 12 through the screen 10. The device 1 preferably comprises a means of supplying with particles, for example in the form of a reservoir 21 of particles 3 (FIG. 1a) or a means for spreading 22 of particles 3 (FIG. 1b).

This blocking of the particles 3 can for example take place when the diameter of the smallest sphere inscribed in any of the particles 3 is greater than the diameter of the smallest circle circumscribed in any of the openings of the first outer surface 11. Furthermore, the blocking can also take place when the particles 3 create bridges above an opening. A bridge can arise when the diameter of the particles 3 is greater than one third of the diameter of the openings. The particles 3 then constitute an obstacle for the particles upstream, to the extent that they finish by piling up.

The particles 3 generally have a certain size distribution, for example a Gaussian distribution. Consequently, certain particles 3 risk passing through the screen 10 and therefore not being a part of the particle structure 30.

Preferably, the transport fluid 2 is a gas, preferably air, argon or nitrogen. The transport fluid 2 can be a liquid, for example water.

In an embodiment of the invention, the screen 10 comprises elements that intersect, so as to block any spherical body more than 10 µm in diameter, preferably 1 µm in diameter, more preferably 0.1 µm in diameter. Any particle 3 of a size substantially greater than this diameter is thus blocked by the screen 10.

In an embodiment of the invention, the screen 10 is a grid, i.e. it comprises elements that form a mesh.

In an embodiment of the invention, the screen 10 is made from a biocompatible material. Preferably, the screen 10 is made from a material that is compatible with the constraints of a 3D printing environment (good resistance to high temperatures, to impacts, to humidity and to electrostatic charges).

Preferably, the structure of the screen 10 is fixed over time: there are no moving parts. Preferably, the screen 10 does not have an electrical function. It is possible, while remaining within the scope of the invention, that the screen be connected to the ground so as to discharge charged particles.

In an embodiment of the invention, the first outer surface 11 of the screen 10 is on the side opposite the screen 10 with respect to the flow generator 20. This can make it possible for the screen 10 to protect the flow generator 20 from fouling by particles 3.

The screen 10 can be produced by at least one of the following methods: weaving, perforations, chemical photo-engraving, electroforming, sintered powder or fibres, and production of a foam.

In an embodiment of the invention, the first outer surface 11 of the screen 10 extends mainly along a first direction 101 and a second direction 102 perpendicular to the first direction 101. The flow generator 20 is thus arranged such that the transport fluid flow 2 that it generates is mainly in a third direction 103 perpendicular to the first 101 and second 102 directions. The particle 3 structure 30 is thus mainly two-dimensional.

The particle 3 structure 30 can comprise a continuous layer of particles 3. It can also comprise particle 3 islands separated from one another. The particle 3 structure 30 can comprise several types of particles 3.

The flow generator 20 preferably makes it possible to manipulate many particles 3 at the same time, for example at least ten particles 3 or at least one hundred particles 3. It is also possible that the flow generator 20 makes it possible to manipulate the particles 3 one by one.

In an embodiment of the invention, the device 1 comprises an equalising device, for example a scraper, that makes it possible to equalise the thickness of the structure 30 formed by particles 3.

In the embodiment of the invention shown in FIG. 1a, the flow generator 20 comprises a suction device provided to create the transport fluid flow 2 from the first outer surface 11 to the flow generator 20 (FIGS. 2, 4, 5, 9 and 11). This makes it possible to suction towards the first outer surface 11 particles 3 initially located on the other side of the screen 10 with respect to the flow generator 20. When the flow generator 20 comprises a suction device, the suction device is preferably located higher than the screen 10 and the particle 3 structure 30 is formed under the screen 10.

In the embodiment of the invention shown in FIG. 1b, the flow generator 20 comprises an ejection device provided to create the transport fluid flow 2 from the flow generator 20 to the first outer surface 11 (FIGS. 3, 6, 10 and 12). This makes it possible to eject from the first outer surface 11 particles 3 initially located on the other side of the screen 10 with respect to the flow generator 20. In the embodiment of the invention shown in FIG. 1b, the device 1 further comprises a spreading means 22, which can comprise a scraper, making it possible to supply the first outer surface 11 with particles 3. The spreading means 22 spread particles 3 over the first outer surface 11 and then the ejection device ejects at least one portion of the particles 3. Preferably, the ejected particles 3 are collected by a particle 3 collector 23.

Preferably, in particular when the structure 30 formed by particles is below the screen 10, the structure 30 formed by particles adhere to the first outer surface 11 because the transport fluid flow 2 is maintained and/or by at least one of the following forces: gravity, centripetal force, mechanical pulse, magnetic force, aerodynamic force, electrostatic force, contact force, Van der Waals force, capillary force, acoustic pressure. These forces can be local, i.e. correspond only to certain portions of the first outer surface 11, or distributed, i.e. correspond to the entire first outer surface 11. Furthermore, these same forces can be used for detaching, locally or globally, from the screen 10 particles 3 forming part of the structure 30.

Preferably, the device 1 is arranged such that the transport fluid flow 2 passes only through predetermined portions of the first outer surface 11 of the screen 10. This arrangement can be carried out in different ways, which will be described hereinbelow. This can in particular be carried out using a mask 40 (FIGS. 2, 3, 4 and 6), and/or a means of movement of the flow generator 20. A portion of the first outer surface 11 passed through by the transport fluid flow 2 independently of the remainder of the first outer surface 11 can be called "pixel". A pixel can also be a set of particles deposited on a first substrate 60 (FIG. 6) from a pixel of the first outer surface 11. In an embodiment of the invention, a pixel is between 10 µm×10 µm and 1 mm×10 mm, preferably a pixel is approximately 100 µm×100 µm. A pixel can be square, rectangular, a diamond, polygon, circular or have any other shape. Pixels can be different sizes and/or forms on the same screen 10. A voxel is the portion of the particle structure 30 that corresponds to a pixel. The thickness of the screen 10 as well as other parameters can have an impact on the thickness of a voxel. In an embodiment of the invention, the pixels are adjoining. In an embodiment of the invention, pixels partially overlap.

The mask 40 comprises open portions that allow the transport fluid flow 2 to pass and closed portions that do not allow the transport fluid flow 2 to pass.

In an embodiment of the invention, the mask 40 is dynamic, i.e. the configuration of the open and closed portions thereof can be modified. Such a dynamic mask 40 can for example comprise a valve matrix 41 (FIGS. 2, 3, 4, 6, 11 and 12).

In another embodiment of the invention, the mask 40 is static, i.e. the configuration of the open and closed portions thereof cannot be modified. The device 1 thus preferably comprises a means of movement of the flow generator 20.

The mask 40 can for example correspond to the entire first outer surface 11, a line of pixels of the first outer surface 11, two to twenty lines of pixels of the first outer surface 11, one to twenty-five pixels of the first outer surface 11 or a single pixel of the first outer surface 11. Preferably, if it corresponds to one portion only of the first outer surface 11, it is dynamic or the device 1 comprises a means of movement of the mask 40.

In an embodiment of the invention, the flow generator 20 and the mask 40 correspond to the entire first outer surface 11 of the screen 10. The flow generator 20 and the mask 40 are then preferably not provided to be moved.

Figure 2A:
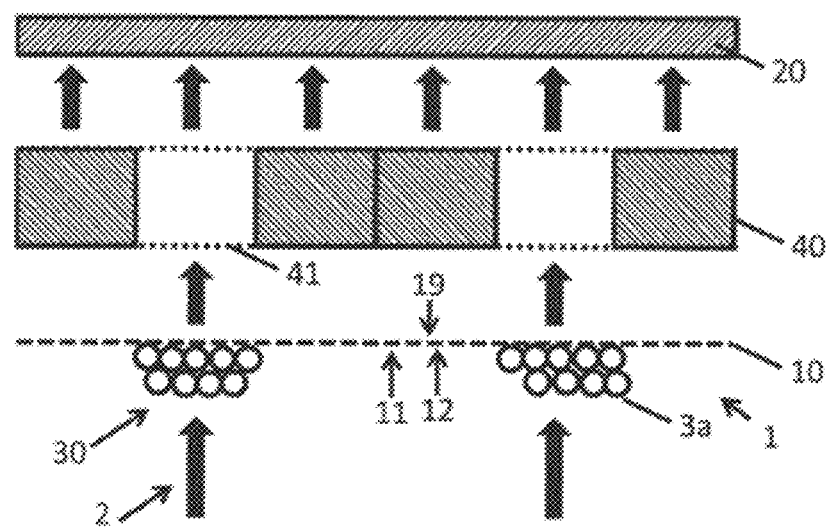
FIGS. 2a and 2b show two steps of using a device for manipulating particles according to an embodiment of the invention.
Figure 2B:
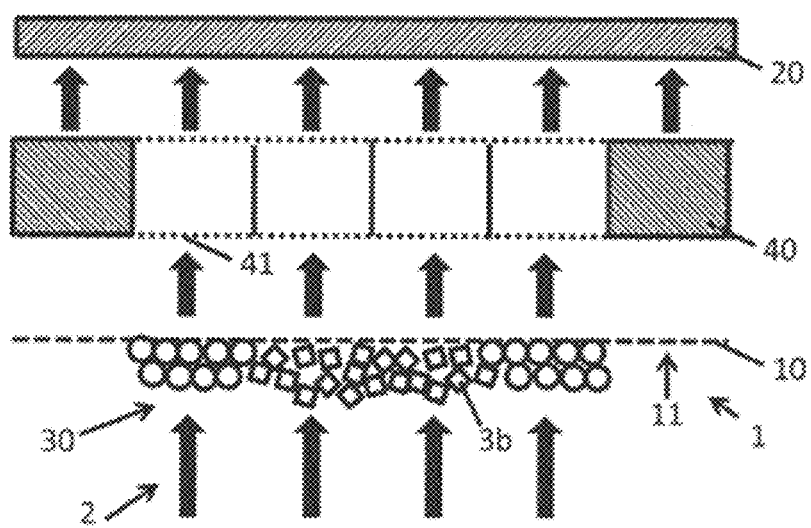

FIGS. 2a and 2b show two steps of using a device 1 according to such an embodiment of the invention, in a case where the flow generator 20 comprises a suction device. The mask 40 preferably comprises a valve matrix 41. The valves 41 can preferably be opened independently from one another, such that the mask 40 allows the transport fluid flow 2 to pass where the valves 41 are open.

During the step shown in FIG. 2a, two first valves 41 are open, and the transport fluid flow 2 only passes through the portions of the first outer surface 11 that correspond to these first two valves 41. A first reservoir (not shown) containing particles 3a of a first type can thus be open facing the first outer surface 11, such that the particles 3a of the first type are suctioned by the transport fluid flow 2 and are placed against the portions of the first outer surface 11 corresponding to these first two valves 41.

During the step shown in FIG. 2b, two second valves 41 are open, and the transport fluid flow 2 only passes through the portions of the first outer surface 11 that correspond to these two second valves 41. A second reservoir (not shown) containing particles 3b of a second type can thus be open facing the first outer surface 11, such that the particles 3b of the second type are suctioned by the transport fluid flow 2 and are placed against the portions of the first outer surface 11 corresponding to these two second valves 41. The particles 3a of the first type remain against the first outer surface 11 for example because the first two valves 41 remain open and/or using at least one of the other forces mentioned hereinabove.

If the particle structure 30 obtained at this moment is the desired structure 30, the method of forming the structure 30 stops. Otherwise, the flow generator 20 can be activated and valves 41 can be opened and to suction pixels of particles 3. It is thus possible to suction a third type of particles.

Figure 3A:
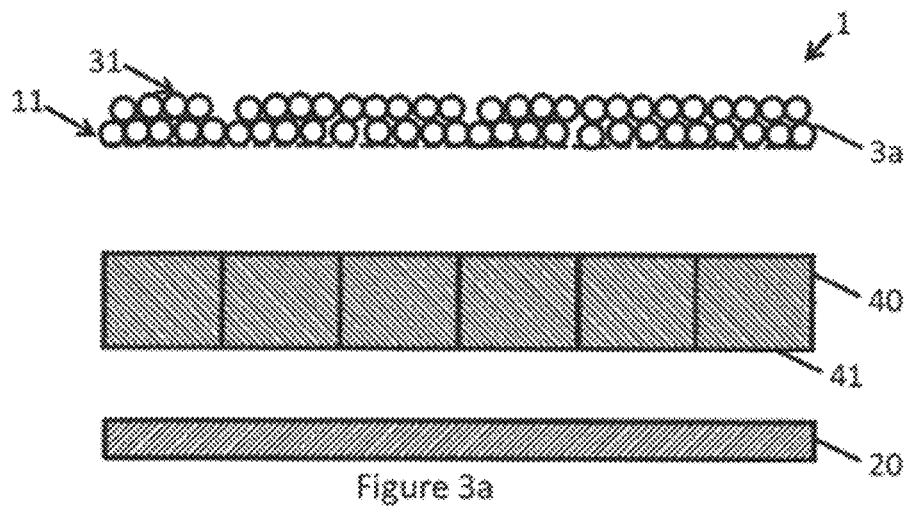
FIGS. 3a to 3c show three steps of using a device for manipulating particles according to an embodiment of the invention.
Figure 3B:
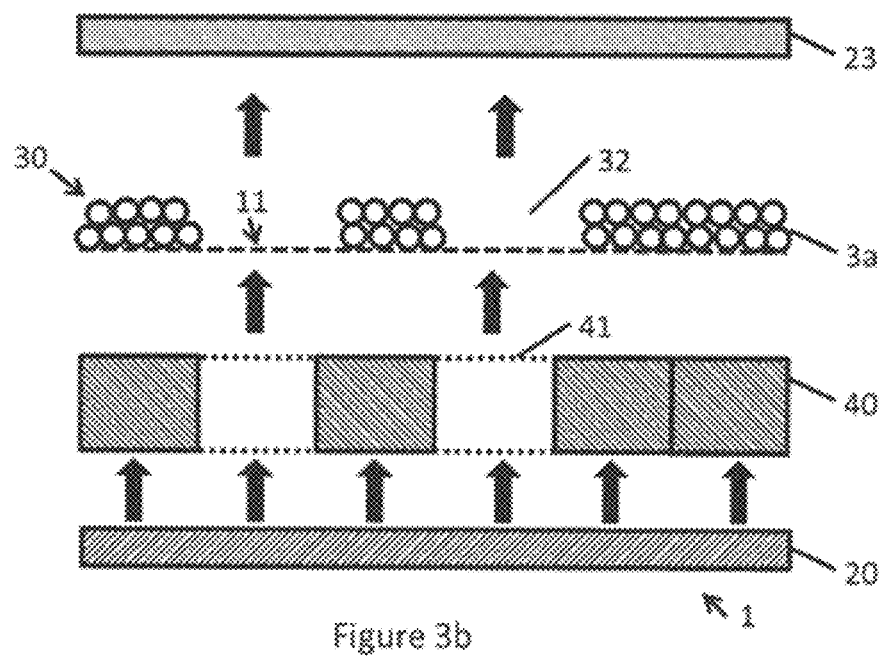
Figure 3C:
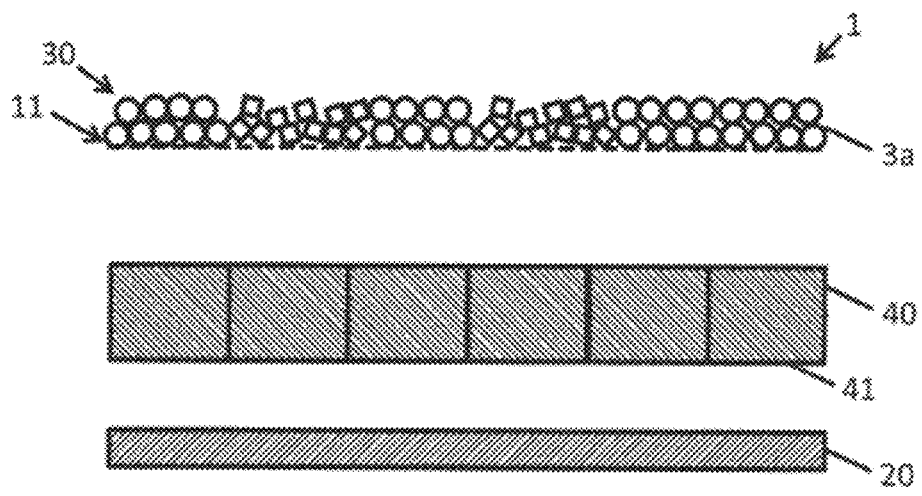

FIGS. 3a to 3c show three steps of using a device 1 according to another embodiment of the invention wherein the flow generator 20 and the mask 40 correspond to the entire first outer surface 11 of the screen 10, in a case wherein the flow generator 20 comprises an ejection device. The mask 40 preferably comprises a valve matrix 41. The valves 41 can preferably be open independently from one another, such that the mask 40 allows the transport fluid flow 2 to pass where the valves 41 are open. Although FIGS. 3a to 3c show a situation wherein the particle structure 30 is located above the screen 10 and the ejection device is below the screen 10, it is possible, while still remaining within the scope of the invention, that the particle structure 30 is located underneath the screen 10 and the ejection device is above the screen 10. This corresponds to inverting all of each of FIGS. 3a to 3c in a horizontal plane.

FIG. 3a shows the situation before the use of the flow generator 20. The first outer surface 11 is covered with an initial layer 31 of particles 3a of a first type. The initial layer 31 has been deposited beforehand, for example by a means of spreading 22 (FIG. 1b). The initial layer 31 preferably comprises only one single type of particles 3a.

During the step shown in FIG. 3b, two first valves 41 are open, and the transport fluid flow 2 only passes through the portions of the first outer surface 11 that correspond to these first two valves 41. The particles 3a of the first type located against the portions of the first outer surface 11 corresponding to these first two valves 41 are ejected by the transport fluid flow 2, leaving holes without particles 32. The ejected particles 3a can be collected by the particle collector 23. The particles 3a remaining on the first outer surface form the particle structure 30 at this moment.

During the step shown in FIG. 3c, the holes without particles 32 are filled with particles 3b of a second type using a supply of particles 3b, for example by the spreading means 22 (FIG. 1b). If the particle structure 30 obtained at this moment is the desired structure 30, the method for forming the structure 30 stops. Otherwise, the flow generator 20 can be activated and valves 41 can be opened and for ejecting voxels of particles 3. It is thus possible to spread a third type of particles.

In an embodiment of the invention, the flow generator 20 and the mask 40 correspond only to a portion of the first outer surface 11. Preferably, the flow generator 20 and the mask 40 correspond to the same portion of the first outer surface 11. The flow generator 20 and the mask 40 are then preferably provided to be moved, preferably parallel to the first outer surface 11.

FIGS. 4a to 4d show four steps of using a device 1 according to such an embodiment of the invention, in the case where flow generator 20 comprises a suction device. The mask 40 preferably comprises a valve matrix 41. The device 1 preferably comprises a means of movement of the flow generator 20. The valves 41 can preferably be opened independently from one another, such that the mask 40 allows the transport fluid flow 2 to pass where the valves 41 are open.

Figure 4A:
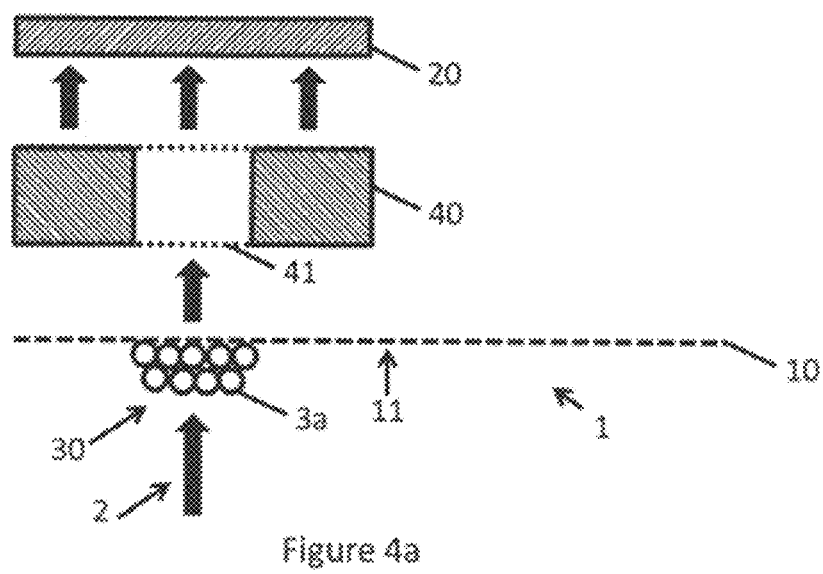
FIGS. 4a to 4d show four steps of using a device for manipulating particles according to an embodiment of the invention.

During the step shown in FIG. 4a, a first valve 41 is open, and the transport fluid flow 2 only passes through the first outer surface 11 corresponding to this first valve 41. A first reservoir (not shown) containing particles 3a of a first type can be open facing the first outer surface 11, such that the particles 3a of the first type are suctioned by the transport fluid flow 2 and are placed against the portions of the first outer surface 11 corresponding to this first valve 41.

Figure 4B:
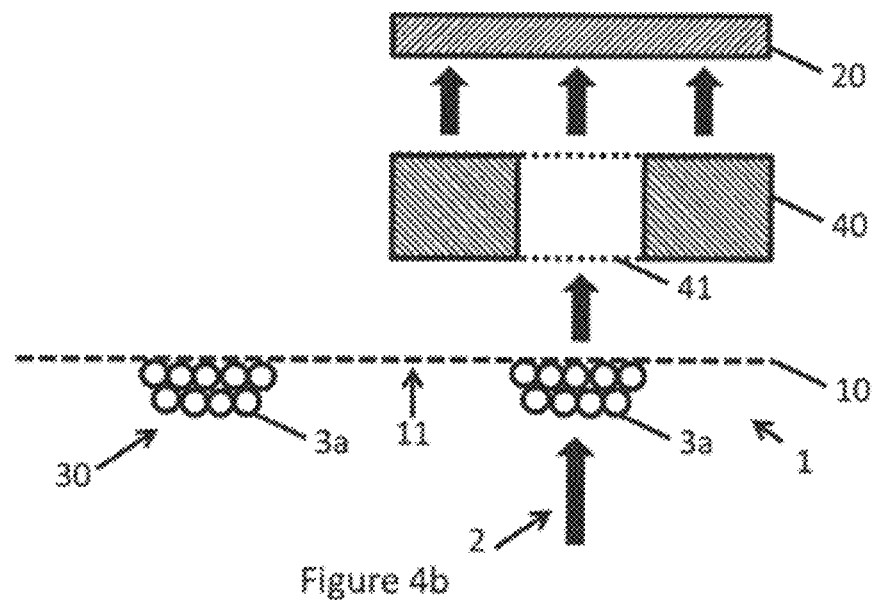

During the step shown in FIG. 4b, the flow generator 20 and the mask 40 are moved with respect to the arrangement shown in FIG. 4a. The first valve 41 is open, and the transport fluid flow 2 only passes through the portions of the first outer surface 11 corresponding to this first valve 41. A first reservoir (not shown) containing particles 3a of a first type can be open facing the first outer surface 11, such that the particles 3a of the first type are suctioned by the transport fluid flow 2 and are placed against the portions of the first outer surface 11 corresponding to this first valve 41 at this moment.

Figure 4C:
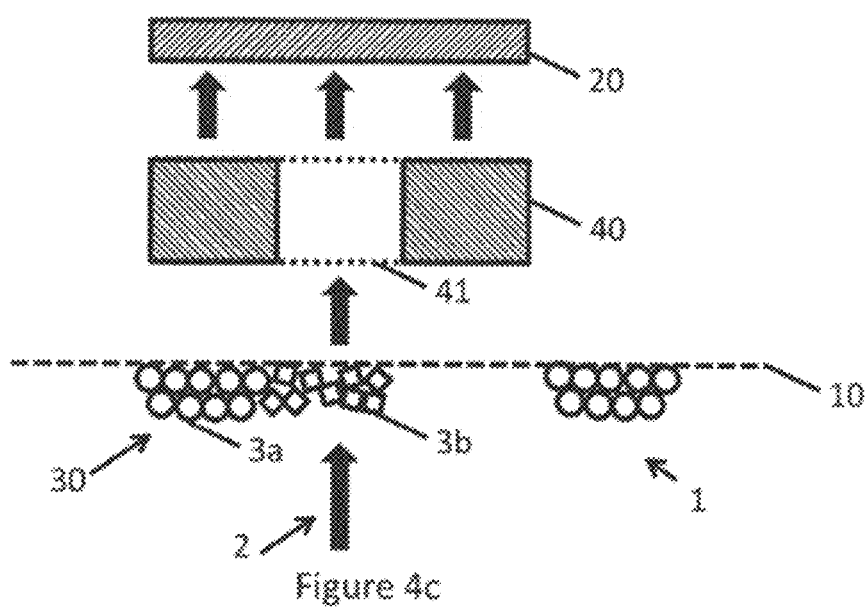

During the step shown in FIG. 4c, the flow generator 20 and the mask 40 are moved with respect to the arrangement shown in FIG. 4b. The first valve 41 is open, and the transport fluid flow 2 only passes through the portions of the first outer surface 11 corresponding to this first valve 41. A second reservoir (not shown) containing particles 3b of a second type can be open facing the first outer surface 11, such that the particles 3b of the second type are suctioned by the transport fluid flow 2 and are placed against the portions of the first outer surface 11 corresponding to this first valve 41 at this moment.

Figure 4D:
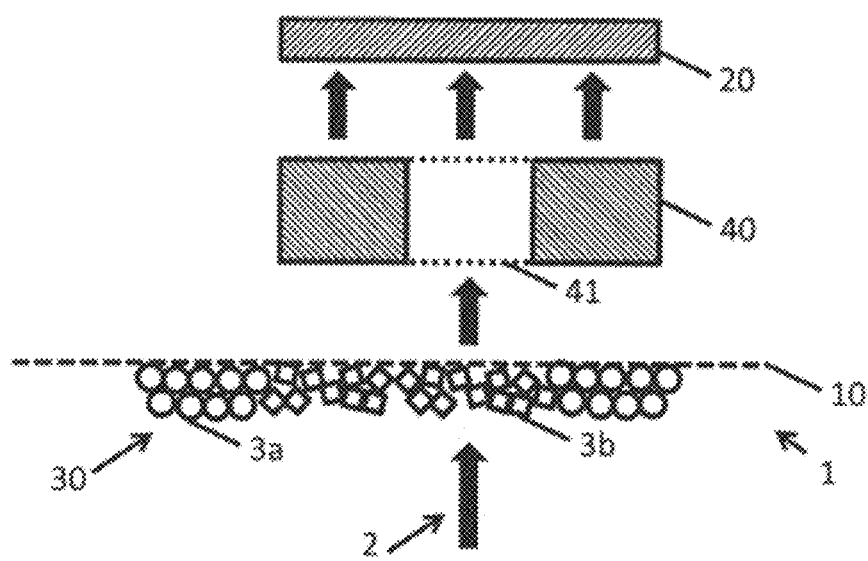

During the step shown in FIG. 4d, the flow generator 20 and the mask 40 are moved with respect to the arrangement shown in FIG. 4c. The first valve 41 is open, and the transport fluid flow 2 only passes through the portions of the first outer surface 11 that correspond to this first valve 41. A second reservoir (not shown) containing particles 3b of a second type can be open facing the first outer surface 11, such that the particles 3b of the second type are suctioned by the transport fluid flow 2 and are placed against the portions of the first outer surface 11 that correspond to this first valve 41 at this moment.

If the particle structure 30 obtained at this moment is the desired structure 30, the method of forming the structure 30 stops. Otherwise, the flow generator 20 can be activated and valves 41 can be open and be able to suction voxels of particles 3. It is thus possible to suction a third type of particles coming from a third reservoir.

It is also possible, while still remaining within the scope of the invention, that a valve other than the first valve 41 be open during one of the steps described in reference to FIGS. 4a to 4d.

The particles 3a, 3b remain against the first outer surface 11 for example using at least one of the other forces mentioned hereinabove.

In an embodiment of the invention not shown, the flow generator 20 and the mask 40 correspond only to a portion of the first outer surface 11 and the flow generator 20 comprises an ejection device.

In an embodiment of the invention, the mask 40 is not provided to be moved (it can for example correspond to the entire first outer surface 11) and the flow generator 20 is provided to be moved, for example using a means of movement of the flow generator 20.

In an embodiment of the invention, the device 1 does not comprise a mask 40 and the flow generator 20 is provided to be moved, for example using a means of movement of the flow generator 20.

Figure 5:
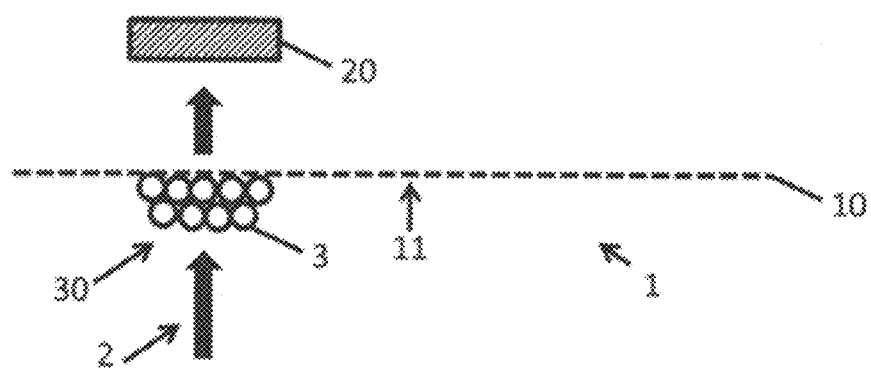
FIG. 5 shows a device for manipulating particles according to an embodiment of the invention.

FIG. 5 shows a device 1 according to such an embodiment of the invention. The flow generator 20 is arranged such that the transport fluid flow 2 passes through only one pixel of the first outer surface 11. The flow generator 20 is moved and the pixels of the first outer surface 11 are thus addressed one after the other to be covered with particles 3. The supply of particles can for example be done via a reservoir of particles that is moved below the screen 10 in parallel with the flow generator 20.

In an embodiment of the invention not shown, the device 1 does not comprise a mask 40 and the flow generator 20 is provided to be moved, for example using a means of movement of the flow generator 20 and the flow generator 20 comprises an ejection device.

Figure 6:
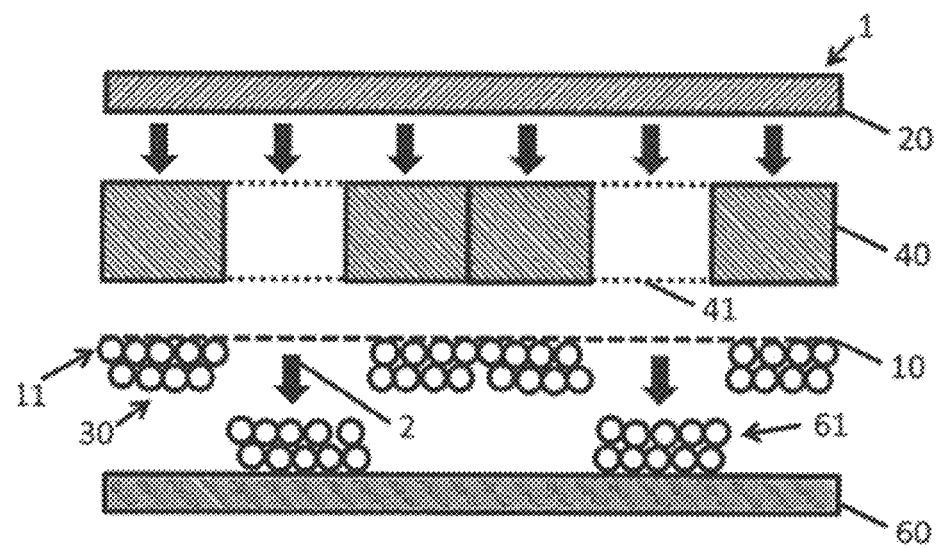
FIG. 6 shows a use of a device for manipulating particles according to an embodiment of the invention.

In an embodiment of the invention, for example the one shown in FIG. 6, predetermined portions of the structure 30 present against the screen 10 are selectively transferred on the surface of a first substrate 60, using the transport fluid flow 2 generated by the flow generator 20 which comprises an ejection device. It is possible that the ejection of the particles be carried out by acoustic pressure. This transfer can be for example carried out pixel by pixel. The first substrate 60 can comprise an upper portion of a 3D printing structure 72 (FIG. 7).

According to a possible embodiment of the invention, several successive transfers take place, from the particle structure 30 to the surface of the first substrate 60.

According to a possible embodiment of the invention, a first uniform structure 30 which comprises only a first type of particles 3a is firstly formed on or under the screen 10. Then, the predetermined portions of the first structure 30 are transferred on the first substrate 60. Then, the remainder of the first structure 30 is removed from the screen 10 and a second uniform structure 30 comprising only a second type of particles 3b is formed on or under the screen 10 and predetermined portions of the second structure 30 are transferred on the first substrate 60. The process can be repeated.

It is thus possible to produce a layer of particles comprising islands 61 of different types of particles on the first substrate 60. This layer can subsequently be used for a 3D printing, in place of the particle structure 30 located against the first outer surface 11 of the screen 10.

In an embodiment of the invention, the mask 40 is a matrix comprising ten columns and one hundred rows of pneumatic electrostatic valves 41 spaced 1 mm from one another. The columns are offset vertically from one another by 100 μm in order to obtain a resolution of 100 μm. The mask 40 is about 10 cm by 1 cm. The mask 40 and the flow generator 20 are coupled so as to be moved at the same time. The mask 40 and the flow generator 20 sweep the entire first outer surface 11 of the screen 10 in order to compose a structure 30 of powders against the screen 10 or a layer of powders against the first substrate 60.

The device 1 can be used for a 3D printing. For example, the first type of particles 3a can be suitable for forming an object via 3D printing using sintering and the second type of particles 3b can be a support powder that is not sintered. In particular, the particles of the first type 3a can be sintered at a first sintering temperature and the particles of the second type 3b cannot be likely to be sintered at the first sintering temperature or be inert. The particles 3b of the second type can be used as a support for the upper strata during the 3D printing and be recovered at the end of the 3D printing.

In an embodiment of the invention, the particles 3a of the first type are particles of SLS powder provided for a laser sintering. In an embodiment of the invention, the particles 3a of the first type are made of thermoplastic polymer, for example PA12. In an embodiment of the invention, the particles 3b of the second type are made of ceramic, plaster or alumina.

Figure 7A:
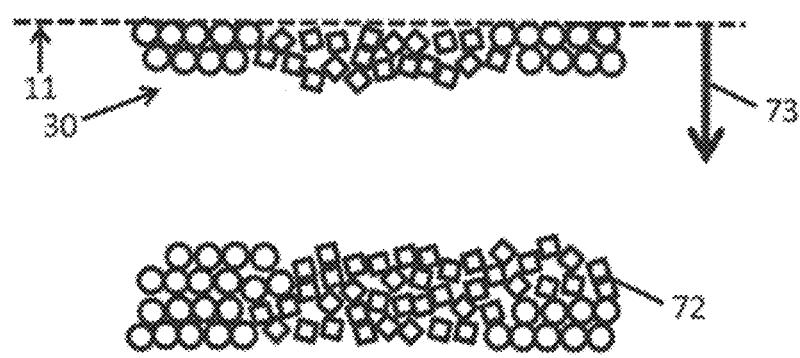
FIGS. 7a and 7b show a use of the particle structure in a 3D printing, according to an embodiment of the invention.
Figure 7B:
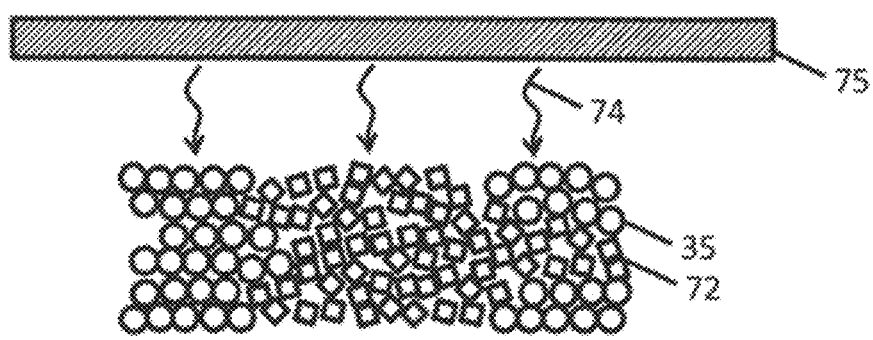

FIGS. 7a and 7b show a use of the particle 3 structure 30 in a 3D printing, according to an embodiment of the invention.

FIG. 7a shows the screen 10 under which the particle 3 structure 30 is formed and a 3D printing structure 72 which is an object in the process of 3D printing. The 3D printing structure 72 comprises many particles that are already agglomerated together. In other words, the 3D printing 72 comprises a stack of strata already agglomerated. A means of deposition of the particle 3 structure 30 makes it possible to deposit the particle 3 structure 30 on the 3D printing structure 72. The particle 3 structure 30 thus becomes a stratum 35 of particles 3. The particles 3 of the stratum 35 can thus be agglomerated (FIG. 7b) with the 3D printing structure 72 so as to form a new 3D printing structure on which can be deposited another particle 3 structure 30. The agglomeration can be carried out by an agglomeration means 75, that for example heats or radiates the stratum 35 of particles 3. The agglomeration can be suitable for agglomerating the particles of the first type 3a but not the particles of the second type 3b.

In an embodiment of the invention, the agglomeration means 75 comprises a laser. In an embodiment of the invention, the agglomeration means 75 comprises a means of emitting an infrared radiation (for example a halogen lamp), which can be uniform over the entire stratum 35 of particles 3.

The deposition means makes it possible preferably to move the screen 10 with the particle 3 structure 30 from a formation zone, where the particle 3 structure 30 had been formed, to a printing zone where the 3D printing structure 72 is located. This first movement can for example be horizontal and/or vertical. The deposition means preferably makes it possible to move the screen 10 with the particle 3 structure 30 to the 3D printing structure 72 as indicated by the arrow 73 in FIG. 7a.

The deposition means also preferably makes it possible to detach the particle 3 structure 30 from the first outer surface 11 of the screen 10. The deposition means can be arranged to detach the entire structure 30 from the first outer surface 11 in one go, or to detach selected portions from the first outer surface 11.

Figure 8A:
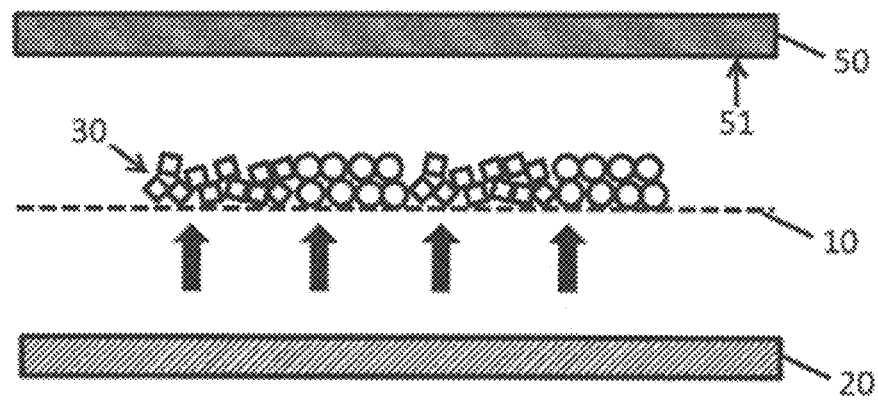
FIGS. 8a and 8b show a use of the particle structure in a 3D printing, according to an embodiment of the invention.
Figure 8B:
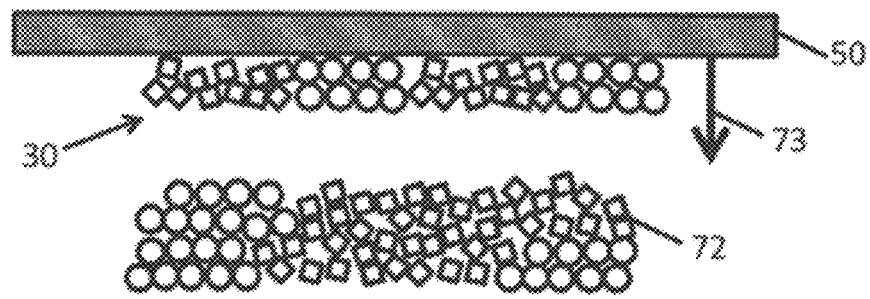

FIGS. 8a and 8b show a use of the particle 3 structure 30 in a 3D printing, according to an embodiment of the invention.

The particle structure 30 present on the first outer surface 11 is first of all transferred under a transfer surface 51 of the mobile transfer substrate 50. This can for example be carried out using an ejection device of the flow generator 20.

Then, the transfer substrate 50 is moved so as to deposit the particle 3 structure 30 on the 3D printing structure 72 as indicated by the arrow 73 in FIG. 8b. The agglomeration method shown in FIG. 7b can then be used.

When the 3D printing is completed, if the particles 3b of the second type have not been agglomerated, they are detached from the printed object.

Figure 9:
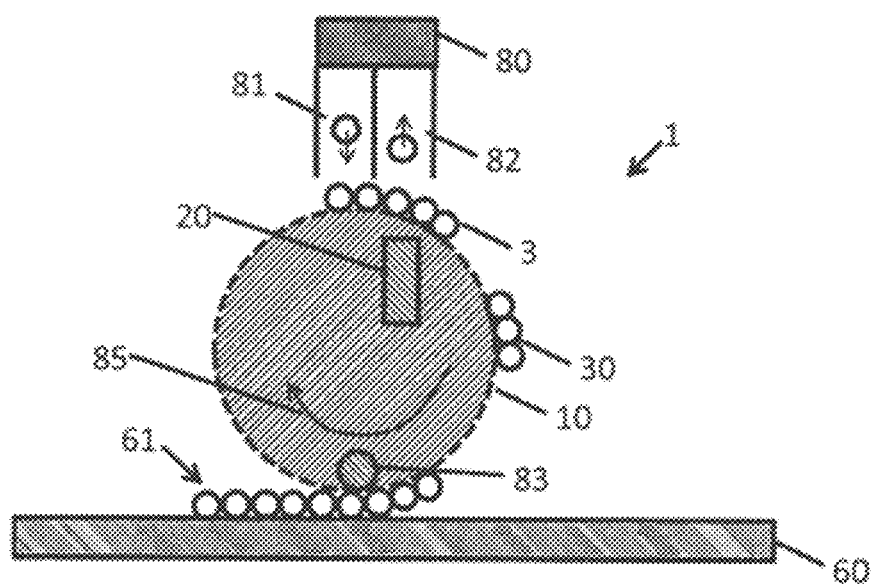
FIG. 9 shows a device for manipulating particles according to an embodiment of the invention.

FIG. 9 shows a device 1 according to an embodiment of the invention wherein the screen 10 is a cylinder arranged to rotate according to a cylinder axis as indicated by the arrow 85. The first outer surface 11 of the screen 10 is cylindrical. Preferably, the flow generator 20 generates a transport fluid flow 2 that has at least one component perpendicular to the cylinder axis. The supply of particles 3 is provided by a supply element 80. The supply element 80 comprises a supply channel 81 for sending particles 3 to the first outer surface 11, a scraper (not shown) and a collection channel 82 for recovering the extra particles 3. The flow generator 20 is located inside the cylinder formed by the screen 10. It controls the transport fluid flow 2 to determine the portions of the first outer surface 11 on which the particles 3 are deposited. The flow generator 20 preferably comprises an ejection device.

The particle 3 structure 30 is maintained on the first outer surface 11 using an adhesion distributed over the first outer surface 21. It is detached from the first outer surface 11 using a detaching cylinder 83 that makes it possible to locally break the adhesion forces between the first outer surface 11 and the particles 3. The detached particles 3 are then deposited on the first substrate 60.

Figure 10:
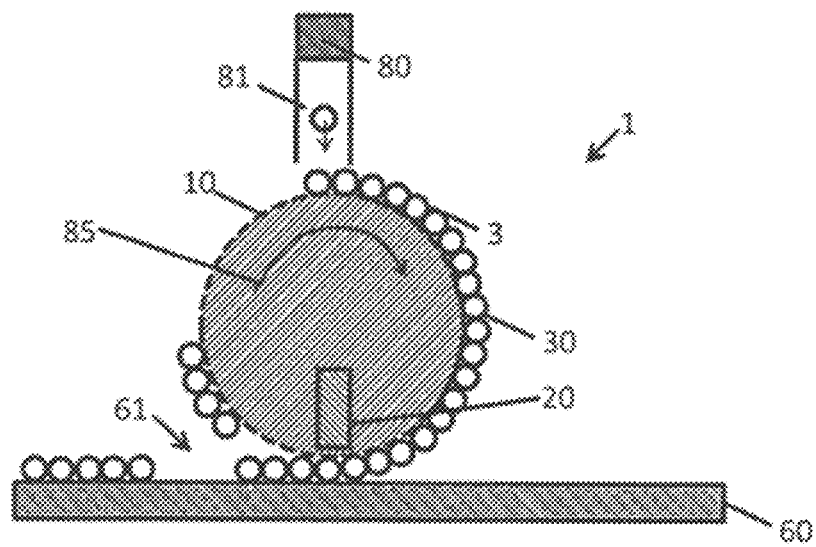
FIG. 10 shows a device for manipulating particles according to an embodiment of the invention.

In an embodiment of the invention shown in FIG. 10, the flow generator 20 is located facing the first substrate 60. The supply element 80 continuously deposits particles 3 on the screen. The cylindrical screen 10 continuously supplies particles 3 facing the flow generator 20. The particles 3 are selectively deposited on the first substrate 60 via ejection using the control of the flow generator 20, for example if the latter comprises an ejection device.

Figure 11:
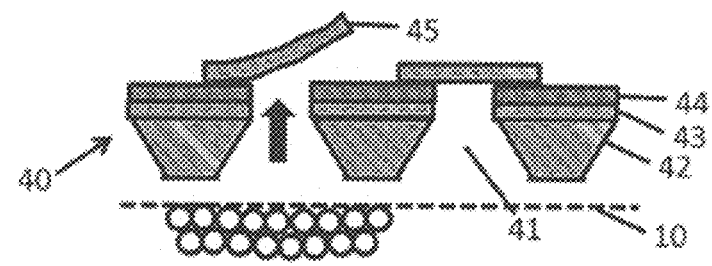
FIG. 11 shows a portion of the valve matrix 41 according to an embodiment of the invention.
Figure 12:
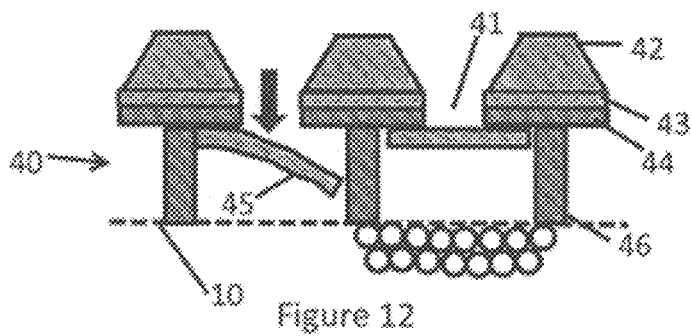
FIG. 12 shows a portion of the valve matrix 41 according to an embodiment of the invention.

FIG. 11 shows a portion of the valve matrix 41 according to an embodiment of the invention. FIG. 12 shows a portion of the valve matrix 41 according to an embodiment of the invention. Each valve preferably comprises a rigid portion 42, a first electrode 43, a dielectric portion 44 and a second electrode 45. The second electrode 45 is flexible and is provided to open and close. The second electrodes 45 can for example be made using a sacrificial layer or via assembly. The valves 41 are preferably arranged according to a network of lines and columns. The valves 41 can preferably be addressed by passive addressing.

FIG. 11 corresponds to a case where the flow generator 20 comprises a suction device.

FIG. 12 corresponds to a case where the flow generator 20 comprises an ejection device. In an embodiment of the invention, separators 46 are provided in the space between the screen 10 and the valve matrix 41, to prevent the second electrode 45 from touching the screen 10.

Generally, each valve 41 can comprise a microactuator and/or a MEMS or PCB pneumatic microvalve. Such a microactuator can for example be electrostatic, thermal, electromagnetic, piezoelectric or other. The valve matrix 41 can be for example carried out by micromachining techniques from a silicon wafer. Each valve 41 can comprise one cavity, for example carried out by anisotropic etching thanks to KOH or a technique of deep reactive ion etching. Each valve 41 can comprise electrodes carried out by techniques of LPCVD deposition (low-pressure chemical-vapour deposition).

Figure 13:
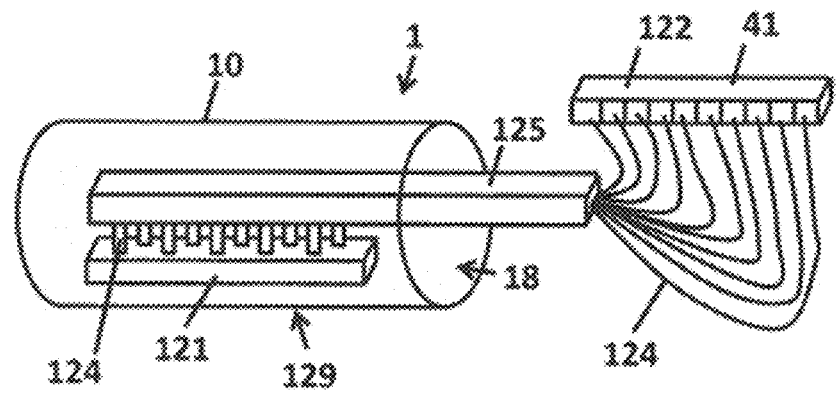
FIG. 13 shows a device according to an embodiment of the invention wherein the screen is cylindrical.
Figure 14:
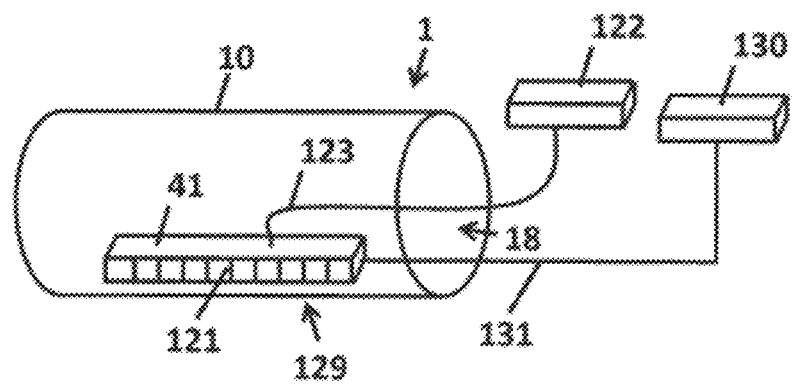
FIG. 14 shows a device according to another embodiment of the invention wherein the screen is cylindrical.

FIG. 13 shows a device 1 according to an embodiment of the invention where the screen 10 is cylindrical. FIG. 14 shows a device 1 according to another embodiment of the invention where the screen 10 is cylindrical. Any other shape of the screen 10 is possible. For example, any shape such that the first outer surface of the screen 10 is convex and delimits at least partially an interior space 18. The screen 10 comprises a detachment zone 129 where the particles are separated from the first outer surface 11. This detachment zone 129 is preferably located downwards, for example facing the 3D printing structure 72. The flow generator 20 is preferably an ejection device.

The flow generator 20 comprises a first portion 121 located inside the cylindrical screen 10. The first portion 121 comprises a print head located in the proximity of the detachment zone 129. Preferably, the print head is located between the axis of the cylindrical screen 10 and the detachment zone 129.

Preferably, the first portion 121 of the flow generator 20 comprises a plurality of openings directed towards the first outer surface 11 of the screen 10, and in particular towards the detachment zone 129. Each of the openings makes it possible to eject or to suction a transport fluid flow element. Thus, it is possible to decide which particles are ejected from the screen 10 or suctioned on the screen 10. The openings are preferably arranged to be staggered, such that the pixels of different lines are offset.

The first portion 121 of the flow generator 20 is connected fluidically to at least one fluidic communication means 123. This fluidic communication 123 means can for example comprise a plurality of pipes 124 (FIG. 13). The fluidic communication means 123 exit from the cylindrical screen 10 by one end of the latter. Preferably, the pipes 124 pass through a rigid duct 125 to exit from the cylindrical screen 10 (FIG. 13).

The flow generator 20 comprises a second portion 122 located outside of the cylindrical screen 10.

In the embodiment of the invention shown in FIG. 13, the second portion 122 of the flow generator 20 preferably comprises valves 41, for example arranged in a valve matrix 41. Each valve 41 is connected to a pipe 124. The valves 41 make it possible to control fluid flow elements that exit from the openings of the first portion 121 of the flow generator 20. Thus, it is possible to control the pixels of particles that are detached from the first outer surface of the screen 10 and are deposited on the 3D printing structure 72 or any other support located under the detachment zone.

The device 1 preferably comprises between 10 and 500 pipes 124, more preferably between 50 and 200 pipes 124. Preferably, the outputs of the pipes 124 towards the detachment zone 129 are arranged to be staggered, so as to increase the resolution of the deposition.

The device 1 preferably comprises a means for cooling valves 41.

In the embodiment of the invention shown in FIG. 14, the first portion 121 of the flow generator 20 preferably comprises valves 41, for example arranged in a valve matrix 41. The valves 41 are fluidically connected by the fluidic communication means 123 to the second portion 122 of the flow generator 20. Preferably, the fluidic communication means 123 comprises one single pipe. However, it is possible, while still remaining within the scope of the invention, that it comprises a plurality of them. The valves 41 make it possible to control fluid flow elements that exit from the openings of the first portion 121 of the flow generator 20 facing the detachment zone 129. Thus, it is possible to control the pixels of particles that are detached from the first outer surface of the screen 10 and are deposited on the 3D printing structure 72 or any other support located under the detachment zone.

The valve matrix 41 is preferably connected to a control unit 130 by an electrical connection means 130. This electrical connection means 130 can be wireless or comprise at least one wire, that then passes preferably through one end of the cylindrical screen 10.

Figure 15:
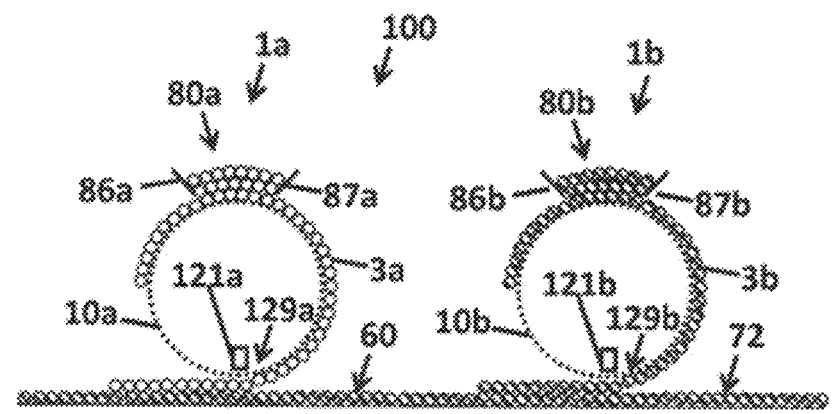
FIGS. 15 and 16 show a system comprising at least two devices for manipulating particles according to an embodiment of the invention.
Figure 16:
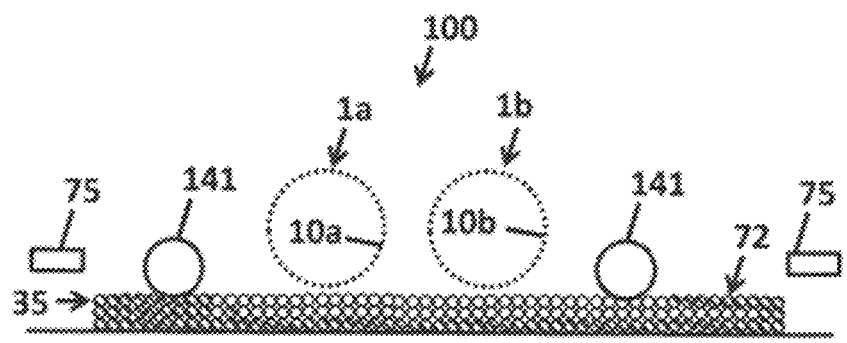

FIGS. 15 and 16 show a system 100 comprising at least two devices 1a, 1b for manipulating particles according to an embodiment of the invention. This system can for example be used in a 3D printing. The screens 10a, 10b and the flow generators are preferably such as described in reference to FIG. 13 or to FIG. 14. In particular, preferably, the flow generators each comprise a first portion 121a, 121b located inside the cylindrical screen 10, in the proximity of the detachment zone 129a, 129b. Thus, the fluid flow elements emitted by the first portions 121a, 121b of the flow generators can eject the particles 3a, 3b present on the first outer surface of the screens 10a, 10b towards a precise position of the 3D printing structure 72. It is possible, while still remaining within the scope of the invention, that the system 100 comprises more than two devices 1 according to the invention. The screens 10a, 10b are arranged parallel to one another, preferably with the axis thereof in the same horizontal plane.

Preferably, the devices 1a, 1b each comprise a supply element 80a, 80b formed by a first scraper 86a, 86b and a second scraper 87a, 87b. The particles 3a, 3b are released on the first outer surface of the screens 10a, 10b by the supply elements 80a, 80b when the screens 10a, 10b are rotating. Preferably, the position of the second scraper 87a, 87b with respect to the first outer surface is selected according to the thickness of the layer of particles 3a, 3b desired on the first outer surface. The scraper can be a roller scraper, for example a counter-rotation cylinder, which, preferably, can vibrate.

The particles 3a, 3b are then retained on the first outer surface by a suction means (not shown).

Preferably, the particles 3a arranged by the first device 1a are particles 3a of a first type, for example likely to be agglomerated by a determined method. Preferably, the particles 3b arranged by the second device 1b are particles 3b of a second type, for example not likely to be agglomerated by this determined method.

Preferably, the screens 10a, 10b rotate by maintaining fixed the axis of rotation thereof when a stratum 35 is deposited, and the first substrate 60, which is used as a support for the 3D printing structure 72 advances in one direction or in another. It is also possible, while still remaining within the scope of the invention, that the screens 10a, 10b have the axis of rotation thereof which is moved parallel to the first substrate 60 and that the latter be fixed. It is also possible that the screens 10a, 10b and the first substrate 60 be moved in a coordinated manner.

The flow generators of the devices 1a, 1b, for example the valve matrices 41, are controlled so as to obtain the desired 3D printing structure 72. Preferably, they are controlled such that the stratum 35 formed by the particles 3a, 3b deposited by the devices 1a, 1b is continuous and does not comprise any holes.

When a stratum 35 of particles has been deposited, and before depositing the following stratum 35, the screens 10a, 10b are moved away from the 3D printing structure 72 by a distance preferably equal to the thickness of the stratum 35. This makes it possible to deposit the following stratum 35. It is possible that the successive strata 35 have different thicknesses.

In an embodiment of the invention, the system 100 further comprises at least one compaction roller 141 forming a means for uniformisation of the height of the stratum of powder deposited on the 3D printing structure. Preferably, the system 100 comprises two uniformisation means, each being located on a side of the screens 10a, 10b. In an embodiment of the invention, the system 100 further comprises at least one agglomeration means 75. Preferably, the system 100 comprises two agglomeration means 75, each being located on a side of the screens 10a, 10b, farther than the uniformisation means.

Preferably, the system 100 operates in the following manner.

A bed of particles of the second type 3b, which are not likely to be agglomerated by the method carried out by the agglomeration means 75, is deposited on the first substrate 60. The particle bed forms the starting 3D printing structure 72.

The supply element 80a is filled with particles of the first type 3a, which are likely to be agglomerated by the method carried out by the agglomeration means 75. The supply element 80b is filled with particles of the second type 3b.

The screens 10a, 10b each rotate about the axis thereof, driving particles of supply elements 80a, 80b which are maintained above using an air suction, for example carried out by an exterior fan. The airflow of the suction is selected according to the type of powder. The thickness of the layer of particles 3a, 3b on the screen 10 is preferably between 50 µm and 500 µm. It is determined in particular using the position of the second scrapers 87a, 87b. The thickness of the stratum 35 can be different from the thickness of the layer on the screen 10. Indeed, the particles of the stratum 35 can spread out after deposition. It is also possible to vary the thickness of the stratum 35 by varying the rotation speed of the screen and/or translation speed of the 3D printing structure 72.

The screens 10a, 10b are moved horizontally in a direction perpendicular to the axis thereof, so as to travel the 3D printing structure 72, while rotating about themselves. Preferably, the rotation and translation speeds are synchronised such that the relative speed of the point that is closest to the screen 10 and of the 3D printing structure 72 is zero. Thus, the particles do not have any speed tangential to the screen during the transfer, which makes it possible for a deposit of greater precision.

The particles that have not been deposited rise back towards the supply elements 80a, 80b and can be used afterwards.

Preferably, once the stratum 35 has been deposited, it is made uniform by the compaction roller 141, then agglomerated by the agglomeration means 75 so as to integrate the 3D printing structure 72. The following stratum 35 is thus deposited.

It is possible that the following stratum 35 is deposited on the return path with respect to the stratum that has just been integrated into the 3D printing structure 72. For example, the deposition of strata (as well as the compaction and the agglomeration) can be done from right to left, and from left to right. In this case, it is preferred that the system comprises two uniformisation means and two agglomeration means 75 as shown in FIG. 16.

Possible applications of the device 1 according to the invention relate to the 3D printing, 2D printing and dosing in the pharmaceutical industry.

In other words, the invention relates to a device 1 and a method for manipulating particles 3. The device 1 comprises a screen 10 used as a support for a particle 3 structure 30 which can selectively be deposited on a first substrate 60. The device 1 comprises a flow generator 20 that generates a transport fluid flow 2 to or from the first outer surface 11 of the screen 10, the transport fluid flow 2 being provided to transport the particles 3. The device 1 can be included in a 3D printing system.

The present invention has been described with respect to specific embodiments, which have a purely illustrative value and must not be considered as limiting. Generally, the present invention is not limited to the embodiments shown and/or described hereinabove. The use of the verbs "include", "comprise", "contain", or any other variant, as well as the conjugations thereof, cannot in any way exclude the presence of elements other than those mentioned. The use of the indefinite article "a", "an", or the definite article "the", to introduce an element does not exclude the presence of a plurality of these elements. The reference numbers in the claims do not limit the scope thereof.

The invention claimed is:

1. A device for manipulating particles, comprising:
 a flow generator arranged to generate a transport fluid flow;
 a screen having a first outer surface configured to form a particle structure, the screen comprising through-holes opening via openings onto the first outer surface, the openings in the first outer surface of the screen are such that the first outer surface blocks the particles outside of the screen, and allows the transport fluid flow to pass via the holes through the screen;
 a mask positioned between the flow generator and the screen, wherein the mask is arranged such that a configuration of open and closed portions thereof are configured for modification in such a way that the transport fluid flow only passes through predetermined portions of the first outer surface and transports the particles from the first outer surface.

2. The device of claim 1, wherein the flow generator is movable.

3. The device of claim 1, wherein the mask is movable.

4. The device of claim 1, wherein the mask comprises a valve matrix.

5. The device of claim 1, wherein the mask is movably coupled to the flow generator such that the transport fluid flow and the mask correspond to the same portions of the first outer surface.

6. The device of claim 1, wherein the first outer surface of the screen is a substantially convex surface delimiting at least partially an interior space.

7. The device of claim 6, wherein the flow generator comprises a first portion located in the interior space and a second portion located outside the interior space, the first portion and the second portion connected fluidically by a fluidic communication means.

8. The device of claim 7, wherein the first portion or the second portion of the flow generator comprises a plurality of valves.

9. The device of claim 4, wherein each valve of the valve matrix is configured to control a transport fluid flow element configured to pass through one of the predetermined portions of the first outer surface of the screen.

10. The device of claim 7, wherein the first portion of the flow generator comprises a plurality of openings directed towards the first outer surface of the screen, and wherein the device is configured such that a transport fluid flow element passes into one of said openings.

11. The device of claim 4, wherein the valves of the valve matrix are micro-speakers.

12. A device for manipulating particles, comprising:
 a flow generator arranged to generate a transport fluid flow; and
 a screen having a first outer surface configured to form a particle structure, the screen comprising through-holes opening via openings onto the first outer surface, a mask positioned between the flow generator and the screen, wherein the mask is arranged such that a configuration of open and closed portions thereof are configured for modification in such a way that the transport fluid flow only passes through predetermined portions of the first outer surface and transports the particles from the first outer surface, and wherein the flow generator comprises an ejection device configured to create the transport fluid flow from the flow generator to the first outer surface.

13. A device for manipulating particles, comprising:

a flow generator arranged to generate a transport fluid flow; and a screen having a first outer surface configured to form a particle structure, the screen comprising through-holes opening via openings onto the first outer surface, the openings in the first outer surface of the screen are such that the first outer surface blocks the particles outside of the screen, and allows the transport fluid flow to pass via the holes through the screen; and a valve matrix, wherein each valve of the valve matrix is configured to control a transport fluid flow element configured to pass through a predetermined portion of the first outer surface of the screen in such a way that the transport fluid flow only passes through predetermined portions of the first outer surface and transports the particles from the first outer surface.

14. The device of claim 13, wherein the flow generator comprises an ejection device configured to create the transport fluid flow from the flow generator to the first outer surface.

15. The device of claim 14, further comprising suction means configured to retain the particles on the first outer surface.

16. The device of claim 14, wherein the screen is movable.

17. The device of claim 14, wherein the ejection device comprises a sound wave emitter.

* * * * *

UNITED STATES PATENT AND TRADEMARK OFFICE
CERTIFICATE OF CORRECTION

| | | |
|---|---|---|
| PATENT NO. | : 11,338,509 B2 | Page 1 of 1 |
| APPLICATION NO. | : 16/336326 | |
| DATED | : May 24, 2022 | |
| INVENTOR(S) | : Bedoret et al. | |

It is certified that error appears in the above-identified patent and that said Letters Patent is hereby corrected as shown below:

In the Claims

| Column | Line | |
|---|---|---|
| 24 | 39 | change "a substantially convex" to -- a convex -- |

Signed and Sealed this
Twenty-seventh Day of June, 2023

Katherine Kelly Vidal
*Director of the United States Patent and Trademark Office*